United States Patent [19]

Patret

[11] Patent Number: 5,661,633

[45] Date of Patent: Aug. 26, 1997

[54] KEYBOARD AND SCREEN PERIPHERAL DEVICE FOR A COMPUTER AND A DESK PAD

[75] Inventor: Jean-Marc Patret, Vincennes, France

[73] Assignee: Source Developpement, France

[21] Appl. No.: 537,799

[22] PCT Filed: Jan. 30, 1995

[86] PCT No.: PCT/FR95/00100

§ 371 Date: Oct. 27, 1995

§ 102(e) Date: Oct. 27, 1995

[87] PCT Pub. No.: WO95/24008

PCT Pub. Date: Sep. 8, 1995

[30] Foreign Application Priority Data

Mar. 2, 1994 [FR] France ................................ 94 02404

[51] Int. Cl.$^6$ ................................................ G06F 1/16
[52] U.S. Cl. ........................................... 361/683; 400/692
[58] Field of Search ................................ 200/517, 302.1, 200/302.2, 5 A; 345/168, 169, 173, 905; 40/358, 107; 400/492, 494, 682, 692, 693; 364/708.1; 361/680–683; 341/22

[56] References Cited

U.S. PATENT DOCUMENTS

| | | | |
|---|---|---|---|
| 3,978,297 | 8/1976 | Lynn et al. | 200/302.2 X |
| 5,237,486 | 8/1993 | LaPointe et al. | 361/681 |
| 5,241,303 | 8/1993 | Register et al. | 345/168 |
| 5,307,297 | 4/1994 | Iguchi et al. | 364/708.1 |
| 5,365,230 | 11/1994 | Kikinis | 341/22 |
| 5,400,055 | 3/1995 | Ma et al. | 345/168 |
| 5,442,151 | 8/1995 | Strang et al. | 200/302.2 |

FOREIGN PATENT DOCUMENTS

| | | | |
|---|---|---|---|
| 251492 | 1/1988 | European Pat. Off. | G06F 1/00 |
| 378889 | 7/1990 | European Pat. Off. | G06F 3/033 |
| 398055 | 11/1990 | European Pat. Off. | G06F 3/033 |
| 3511353 | 10/1986 | Germany | G06F 3/02 |
| 93 16 733 | 5/1994 | Germany | G06F 3/023 |
| 2193023 | 1/1988 | United Kingdom | G06K 9/00 |

*Primary Examiner*—Michael W. Phillips
*Attorney, Agent, or Firm*—McCormick, Paulding & Huber

[57] ABSTRACT

A peripheral device for a computer or the like comprises: a thin flat housing suitable for resting on a work surface and having a generally plane and smooth top surface; a keyboard, and a flat screen disposed in a central zone of the device; and two blank zones situated on either side of said central zone. The dimensions of the housing are chosen so that it constitutes a desk pad that permanently occupies a portion of a work surface. The invention is applicable to improving workstation or computer ergonomics.

18 Claims, 4 Drawing Sheets

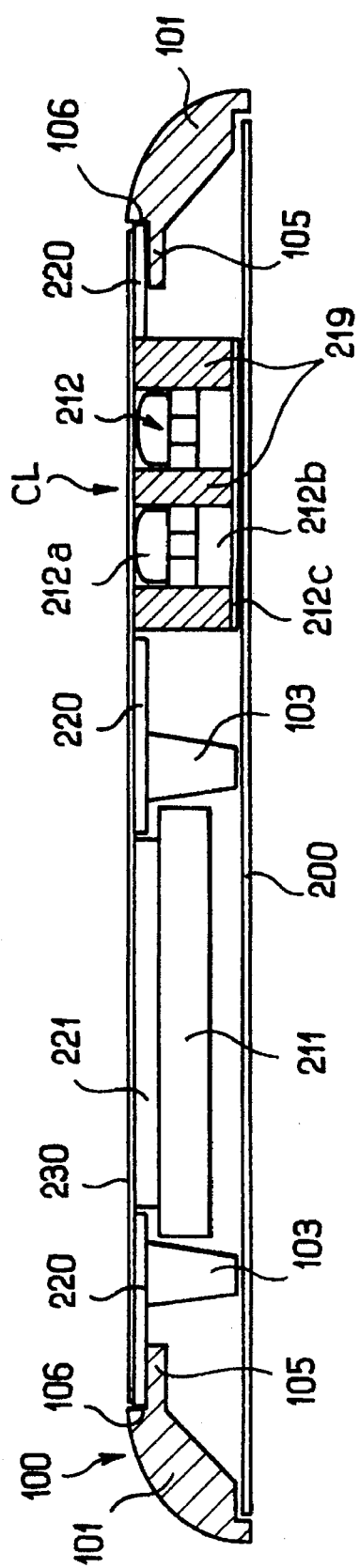
FIG_2
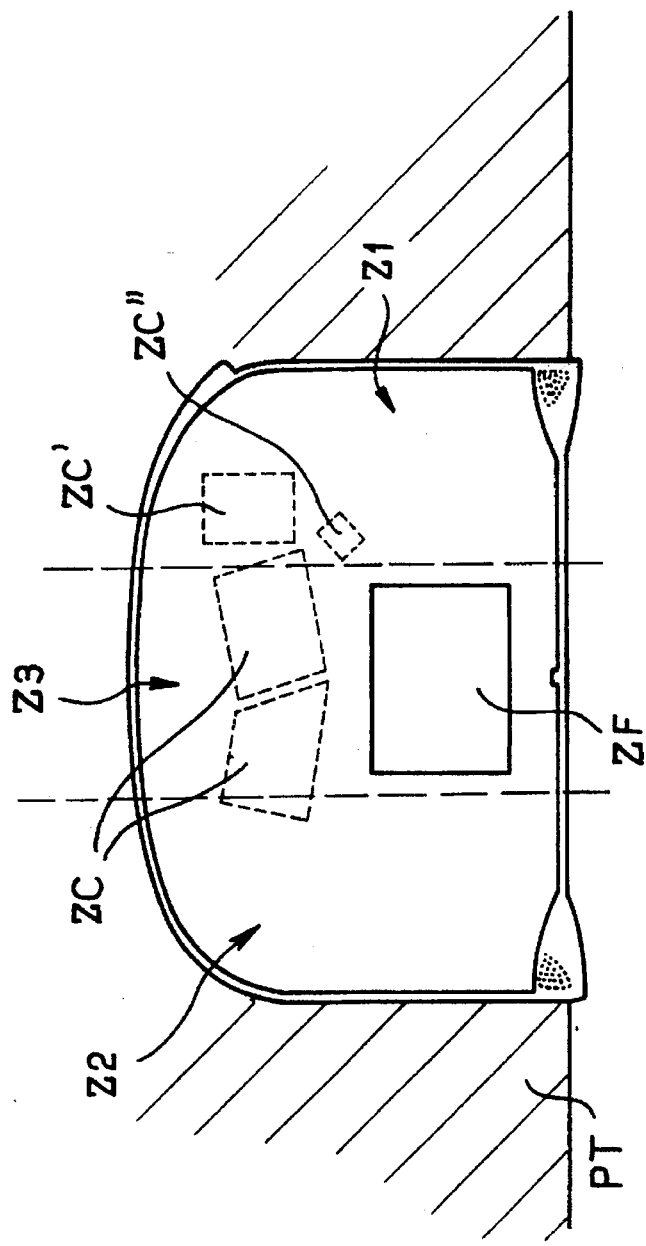
FIG_3

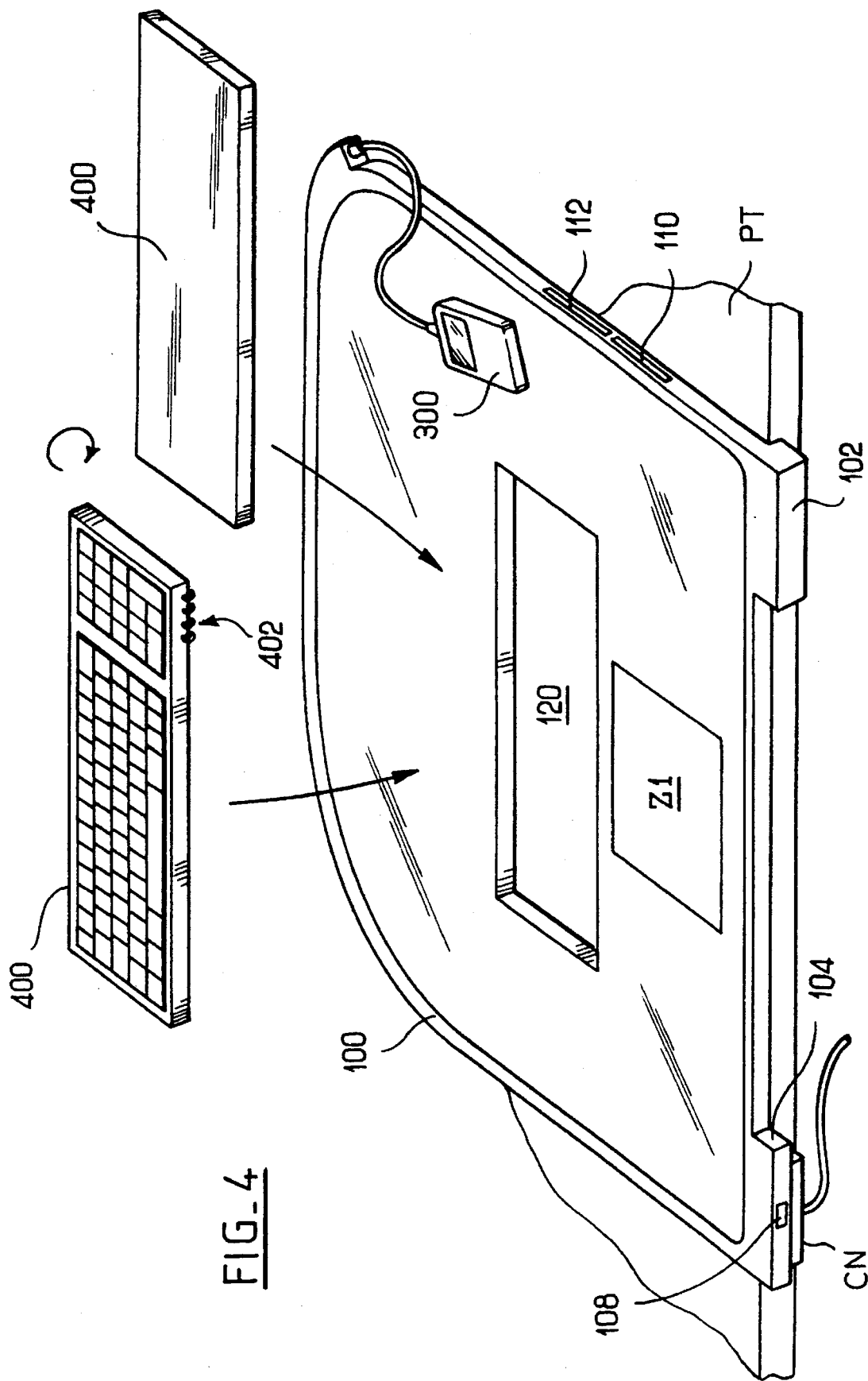
FIG_4

KEYBOARD AND SCREEN PERIPHERAL DEVICE FOR A COMPUTER AND A DESK PAD

BACKGROUND OF THE INVENTION

The present invention relates in general to computer equipment, and more particularly to a novel configuration of peripherals for a personal workstation or computer.

Conventionally, a computer comprises a main housing (central unit), and a keyboard and a screen both of which are physically separate from the central unit.

With portable computers, a single hinged housing has the central unit and the keyboard in a lower portion and a liquid crystal type screen in the other portion.

Such a configuration of the central unit and the peripherals is not optimal since in all cases the computer or its peripherals take up a large amount of space on the user's work surface. In addition, the presence of connecting cables between the various elements is simultaneously unattractive, impractical, and a source of problems in the event of disconnection or damage.

EP-A-0 398 055 discloses an electronic "notepad" having a flat, touch-sensitive screen. Such a device is small, being about the same size as a sheet of paper, and it is thick. It occupies a certain amount of space on a work surface. In addition, because its top surface is not plane, it can under no circumstances encourage the user to use it as a writing-desk or the like.

Document DE-A-35 11 353 describes an electronic notepad that can take the form of a flat keyboard and screen device. Which means that such an electronic notepad is similar to a portable computer of the type having a hinged screen when in its fully deployed position. Nothing suggests that such a device could be used as a writing-desk or the like, and it constitutes merely one more object taking up space on the user's work surface.

Finally, EP-A-0 251 492 discloses a microcomputer having all of its components mounted in a relatively thin housing and that presents a top surface that is generally plane.

However, since the housing contains all of the components of a microcomputer, that housing is necessarily relatively thick, thus remaining with the problem of taking up space, and not encouraging the user in any way to use it as a writing-desk or the like.

The present invention seeks to propose a novel configuration of peripherals for a personal computer, workstation, or the like, which is particularly practical and pleasing in appearance, and which does not pose problems of taking up space on the user's work surface.

SUMMARY OF THE INVENTION

The invention thus provides a peripheral device for a computer or the like, characterized in that it comprises:

a thin flat housing suitable for resting on a work surface and having a top surface that is generally plane and smooth;

a keyboard and a flat screen disposed in a central zone of the device; and two blank zones situated on either side of said central zone;

and in that the housing has dimensions selected to enable it to constitute a desk pad that permanently occupies a portion of a work surface.

Preferred, but non-limiting aspects of the device of the invention are the following:

the screen is disposed between the keyboard and an edge of the device adjacent to the user;

the device comprises:
a metal framework including a peripheral frame and receiving the keyboard and the flat screen;
a transparent plate covering said screen;
a thin plate having an opening for the keyboard and defining with said transparent plate a generally smooth surface; and
a flexible membrane covering said transparent plate and said thin plate;

the transparent plate constitutes a device for detecting x/y coordinates superposed on the flat screen (211);

the keyboard is constituted by a plurality of depressible keys separated from one another by partitions, said keys and said partitions defining a generally plane and continuous top surface over which said membrane is applied;

said keys and said partitions have rounded edges;

said membrane is printed on its inside face while remaining transparent over the screen;

the device has depth of about 40 cm to 60 cm and width of about 60 cm to 80 cm, and it has thickness of about 15 mm;

the housing comprises a recess that is open on top and in which the keyboard is received in removable manner, together with surface electrical contact means between the housing of the keyboard and the wall of the recess;

the housing of the keyboard has a generally smooth bottom surface, said keyboard being capable of being turned upside-down and placed in the recess in such a manner that said bottom surface lies substantially flush with the remainder of the top surface of the device;

in the vicinity of an edge adjacent to the user, the device includes downwardly-projecting positioning portions for co-operating with the edge of a work surface:

the device has a single cable for connection to the central unit of a computer;

the cable leads into one of the positioning portions; and the device includes cordless communication means for communication with an auxiliary peripheral device, and in particular with a mouse.

Other aspects, objects, and advantages of the present invention will appear more clearly on reading the following detailed description of preferred embodiments thereof, given by way of non-limiting example and made with reference to the accompanying drawings, in which:

BRIEF DESCRIPTION OF THE DRAWINGS

FIG. 2 is a section view on line II—II of FIG. 1;

FIG. 3 is a diagrammatic plan view of the device of FIGS. 1 and 2 engaged on a work surface;

FIG. 4 is a diagrammatic perspective view of a second embodiment of the device of the invention.

DETAILED DESCRIPTION OF THE PREFERRED EMBODIMENT

Figure 1:
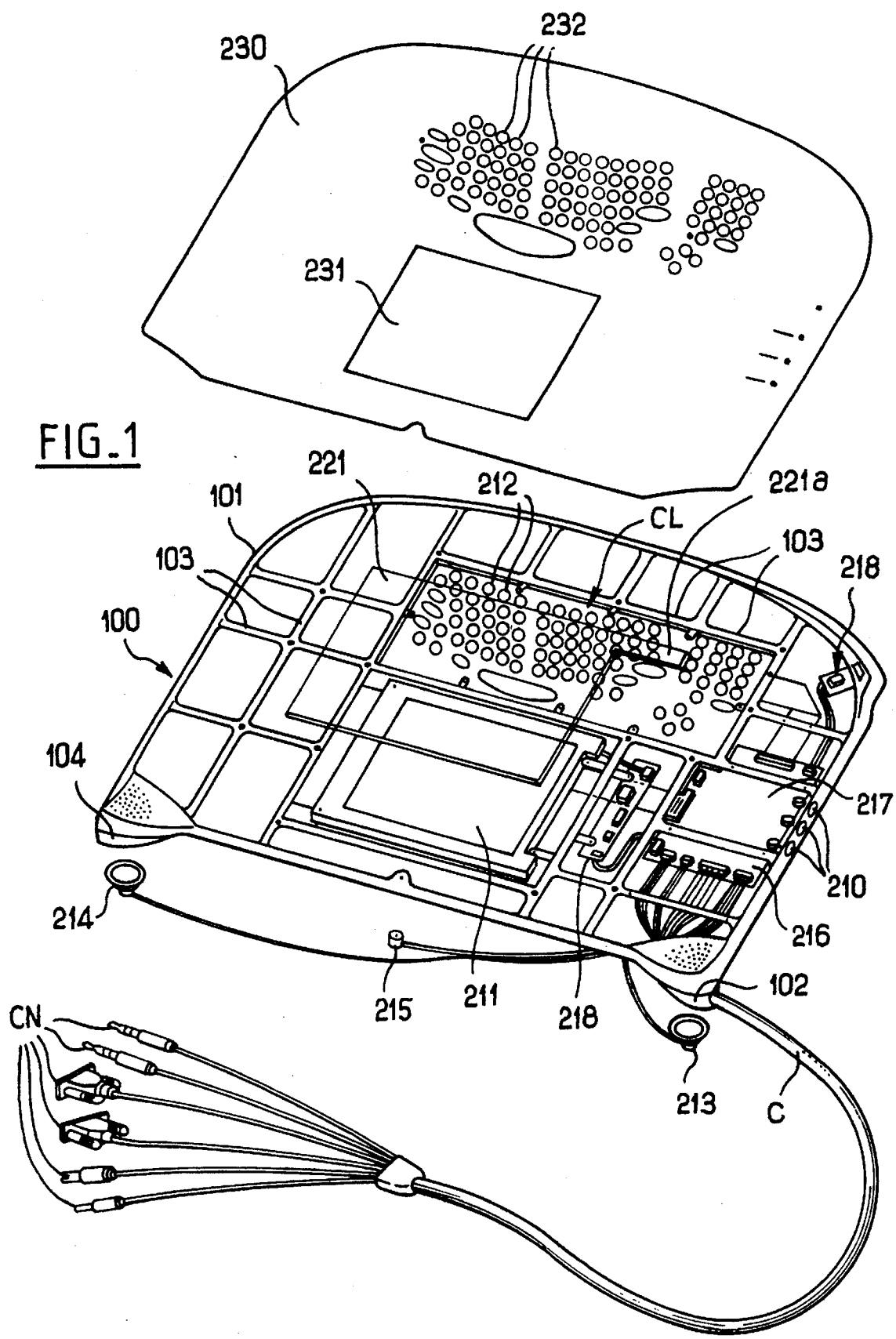
FIG. 1 is an exploded diagrammatic perspective view of a portion of a device constituting a first embodiment of the invention.

A device constituting a preferred embodiment of the invention is now described with reference to FIGS. 1 to 3.

The device comprises a framework 100 preferably made of cast aluminum alloy, comprising a peripheral frame 101 and internal frame members 103.

In this example, the framework 100 is asymmetrical in shape, and about 15 mm thick. In two corner regions for placing at the edge of a work surface PT adjacent to the user (see FIG. 3) it presents two portions 102 and 104 of greater thickness that project downwards.

One of these portions 102, e.g. to the user's right, constitutes a starting point for a cable C for connecting the device to the central unit of a personal type computer. One of the portions 102 and 104 receives an on/off switch (not shown) for the various units of the device.

Each of the portions 102 and 104 has a cavity of Generally triangular shape receiving a respective loudspeaker 213 or 214 so as to give the device the ability to produce sound.

A miniature microphone 215 is also provided, e.g. of the electret type, which is received in the framework in the central region of the edge of the device that extends between the portions 102 and 104.

A series of openings are also provided in one of the side edges of the frame 101 of the framework 100 for miniature potentiometers 210 for adjusting screen brightness and contrast, sound level, etc. . . .

In various inside spaces defined by the frame members 103, the framework 100 is intended to house a certain number of elements:

- a keyboard CL comprising a plurality of depressible keys 212, preferably of the electromechanical type;
- a liquid crystal flat screen 211, in particular a color screen using thin film technology (TFT);
- an infrared transmitter/receiver device 218 for cordless communication with an auxiliary peripheral device such as a mouse (not shown) or some other device; and
- various printed circuit cards 217, in particular for driving the screen 211 and decoding the keyboard CL.

There can also be seen a transparent slab or plate 221 constituting an x/y position detector device for a stylus, or of the touch-sensitive type, which is placed over the screen 211 and which is held in place by the frame members 103. This x/y coordinate detector is preferably of the resistive type which is known per se. Electrical connection therewith is provided via a lateral appendix 221a.

The various elements housed in the housing of the device may be connected to one another in various different ways. In a basic embodiment, appropriate multiconductor cables are provided that pass through the framework. In a variant, a single printed circuit may be provided covering the entire extent of the elements in the device and having conductive tracks that interconnect the various elements.

As shown more precisely in FIG. 2, the housing of the device includes a bottom plate 200 beneath the framework 100. Which plate may be made of aluminum sheet, for example, and is held in appropriate recesses in the frame 101 of the framework 100, so as to provide a generally smooth bottom surface.

In FIG. 2, there can be seen the keyboard CL and the liquid crystal screen 211 surmounted by the transparent slab 221 within the thickness of the framework 100 and between the frame members 103. It can be seen that each key of the keyboard is constituted by a transient electromechanical switch 212b mounted on a printed circuit 212c and having a control rod that receives a generally curved key top 212a.

Between adjacent keys, partitions 219 are provided, being made as a piece of molded plastics material that has as many cells as there are keys 212, and that occupies the same height as the keys. In this way, level with the top surface of the key tops 212a, the top edges of the piece 219 provide a certain amount of surface continuity between the tops of adjacent key tops, for purposes explained below.

In addition, and also for purposes explained below, the edges of the key tops 212a and of the partitions 219 are rounded.

Above the framework 100, there is provided a plane plate 220 of aluminum sheet. This plate has a first opening with the dimensions of the transparent plate 221, and a second opening coinciding with the keys of the keyboard CL. The transparent plate 221 is engaged in the first opening so that its top surface is flush with the top surface of the plate 230. The elements of the keyboard CL are also positioned at a height such that the top surfaces of the key tops 212a and of the partitions 219 are generally coplanar with the top surface of the plate 220.

The peripheral edge of the plate 220 rests on a supporting frame member 105 of the frame 101 and it is held in place by vertical setbacks 106. Fastening and sealing are provided by adhesive, for example.

Over the plate 220, the plate 221, and the keyboard CL, there is provided a flexible membrane 230, e.g. made of polyester and having a thickness of a few tenths of a millimeter, which membrane extends continuously over the entire surface of those elements.

The membrane 230 is transparent and receives silkscreen printing on its bottom surface so as to be dark in color. Over the screen 211 it has a zone 231 that is left transparent. Over each of the keys in the keyboard, it also has markings 232 enabling the keys to be identified.

The membrane 230 is fastened to the device by an appropriate adhesive.

It may be observed at this point that the flexibility of the membrane makes it possible for the user to depress the keys of the keyboard which have a stroke that is preferably in the range 1 mm to 4 mm, with the membrane deforming temporarily in the region of the key in question while it is depressed. It should also be observed that the rounded edges of the key tops 212a and of the partitions 219 makes it possible to avoid the membrane becoming worn thereover during repeated key presses.

The depth of the setback provided in the frame portion 101 of the framework 100 is preferably slightly greater than the sum of the thicknesses of the aluminium sheet 220 and the polyester membrane 230, so as to prevent untimely tearing off of said membrane.

It may be observed at this point that adapting devices of the invention to keyboards that correspond to different countries (e.g. "AZERTY", "QWERTY", etc. . . . keyboards) is done extremely easily by modifying the printing on the flexible membrane 230.

As shown in FIG. 1, the single cable C is terminated by a bundle comprising a plurality of standard connectors CN for connecting the device to the central unit of a personal computer, and in particular:

- to its video output;
- to its keyboard input;
- to one or two serial ports, in particular for the auxiliary peripheral (mouse);
- to a stereo output for loudspeakers;
- to an audio input for the microphone; and
- to a DC power supply for the liquid crystal screen and the various electronic driver circuits.

Because the cable C is a single cable and because of its position, the space it occupies is kept to a minimum. In particular, it can easily be secured to the underside of the user's work surface on its way to the central unit.

According to an important characteristic of the invention, since the top surface of the device is constituted by a continuous sheet 230 which is connected in sealed manner to the frame, said surface can be used as an ordinary work surface when the keyboard and the screen are not in use. The device is protected from dust, liquids, etc. . . . , thereby ensuring its reliability.

FIG. 3 shows clearly how the various elements are distributed over the surface of the device.

Firstly, it can be seen that the keyboard CL is located above the screen, which turns out to be entirely practical on a flat work surface, the screen then being situated in the space between the arms of a user typing on the keyboard.

The device has two essentially blank side zones Z1 and Z2 on which the arms of the user may be rested while working, and a central zone Z3 of width similar to that of each of the zones Z1 and Z2 and containing a screen zone ZE and a plurality of keyboard zones, in particular two zones ZC making up a conventional alphanumerical keyboard. There is another zone ZC' constituting a numerical keypad plus a zone ZC" constituting a group of four cursor keys that overflow into the right-hand blank zone Z1.

FIG. 4 shows a variant embodiment of the invention in which use is made of a keyboard given overall reference 400 which is housed in a generally rectangular housing having contacts 402 along one of its edges. It is designed to be received in a recess 120 formed in the thickness of the device. The recess 120 also contains contacts which are designed to co-operate with the contacts 402.

In this variant, when the keyboard 400 is not in use, it may be removed from the recess 120, turned upside-down, and put back into the recess 120 in the upside-down position so that its smooth bottom surface is exposed on top. This provides a desk pad having a Generally smooth top surface which can be used like an ordinary desk pad while it is not being used as a set of computer peripherals.

FIG. 4 also shows that the device optionally includes two units for reading intelligent cards (memory cards), in particular of the PCMCIA standard type, and preferably also two backlighting units disposed in the vicinity of the PCMCIA cards intended to locate the associated insertion slots 110 and 112 provided in the frame 101.

Advantageously, the computer constituted by a central unit and the peripheral device as described above, or indeed any type of conventional computer, may need to communicate with a portable computer of the electronic notepad type, in a manner that is known per se. Under such circumstances, the device of the invention may advantageously be fitted in a manner that is not shown with a recess for receiving such an electronic notepad, having mutual contacts both for recharging the batteries of the notepad and for two-way communication with the computer, via the cable C.

A computer, like an electronic notepad, can be required to store events which need to be organized and retained in chronological order.

There follows a description of a protocol making it possible when the notepad is connected to the computer, e.g. in the manner described above, to update files of such events in a manner that is automatic and transparent to the user, which files are stored both in the computer and in the notepad.

Column A below shows the contents of an event buffer memory in the notepad, where events are labelled Ea, Eb, and Ec, and are associated with dates and times as determined by the internal clock of the notepad. In like manner, column B shows the contents of a buffer memory in the computer, containing five events E01 to E05 together with the associated dates and times, as determined by the internal clock of the computer.

| (B) COMPUTER In A | (A) NOTEPAD In B |
|---|---|
| 07-01-1994  08:45:53 | 07-01-1994  08:45:53 |

| Date | time | Event | Date | time | Event |
|---|---|---|---|---|---|
| 07-01-1994 | 08:45:53 | E01 | 08-01-1994 | 10:39:25 | Ea |
| 07-01-1994 | 10:48:24 | E02 | 08-01-1994 | 10:42:55 | Eb |
| 07-01-1994 | 17:12:06 | E03 | 10-01-1994 | 13:45:12 | Ec |
| 08-01-1994 | 21:31:40 | E04 | | | |
| 10-01-1994 | 11:20:47 | E05 | | | |

INDEPENDENT USE

When the notepad is placed on its support (or connected by an appropriate cable) so as to be connected to the computer, an updating protocol is automatically started in a manner that is transparent to the user (preferably as a background task) so as to collate the events Ea–Ec and E01–E05 in a buffer memory, e.g. contained in the computer, with all of the events being reclassified in chronological order, as shown below.

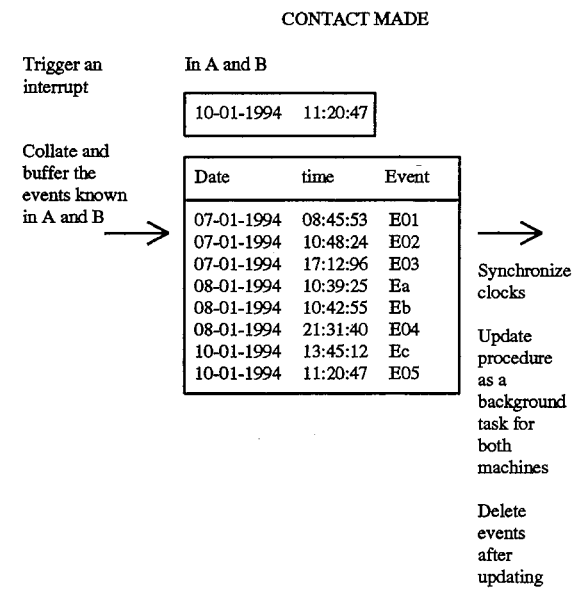

CONTACT MADE

Trigger an interrupt — In A and B: 10-01-1994  11:20:47

Collate and buffer the events known in A and B →

| Date | time | Event |
|---|---|---|
| 07-01-1994 | 08:45:53 | E01 |
| 07-01-1994 | 10:48:24 | E02 |
| 07-01-1994 | 17:12:96 | E03 |
| 08-01-1994 | 10:39:25 | Ea |
| 08-01-1994 | 10:42:55 | Eb |
| 08-01-1994 | 21:31:40 | E04 |
| 10-01-1994 | 13:45:12 | Ec |
| 10-01-1994 | 11:20:47 | E05 |

→ Synchronize clocks

Update procedure as a background task for both machines

Delete events after updating

This protocol also serves to synchronize the internal clocks of the computer and of the notepad.

Thereafter, the contents of the buffer memory containing the collated events is used to update event files contained in the mass memories of the computer and of the note paid, and finally the buffer memories of the computer and the notepad are emptied so that other events can subsequently be collected while they are being used independently, as explained below.

RESULT OF CONTACT

| In A | | In B | |
|---|---|---|---|
| 10-01-1994 11:20:47 | (B) | 10-01-1994 11:20:47 | (A) |

| Date | time | Event |
|---|---|---|
| | | |

| Date | time | Event |
|---|---|---|
| | | |

It may be observed at this point that when the electronic notepad is fitted with a card reader, e.g. for reading PCMCIA type cards, the above-specified protocol may be implemented when a memory card coming from the notepad is inserted in one of the readers 413, 414 fitted to the device of the invention.

By means of this aspect of the present invention, events collected by the user with the help of the computer or of the notepad are grouped together in consistent manner in both machines, and this is done without any need for the user to perform manipulations.

Figure 5:
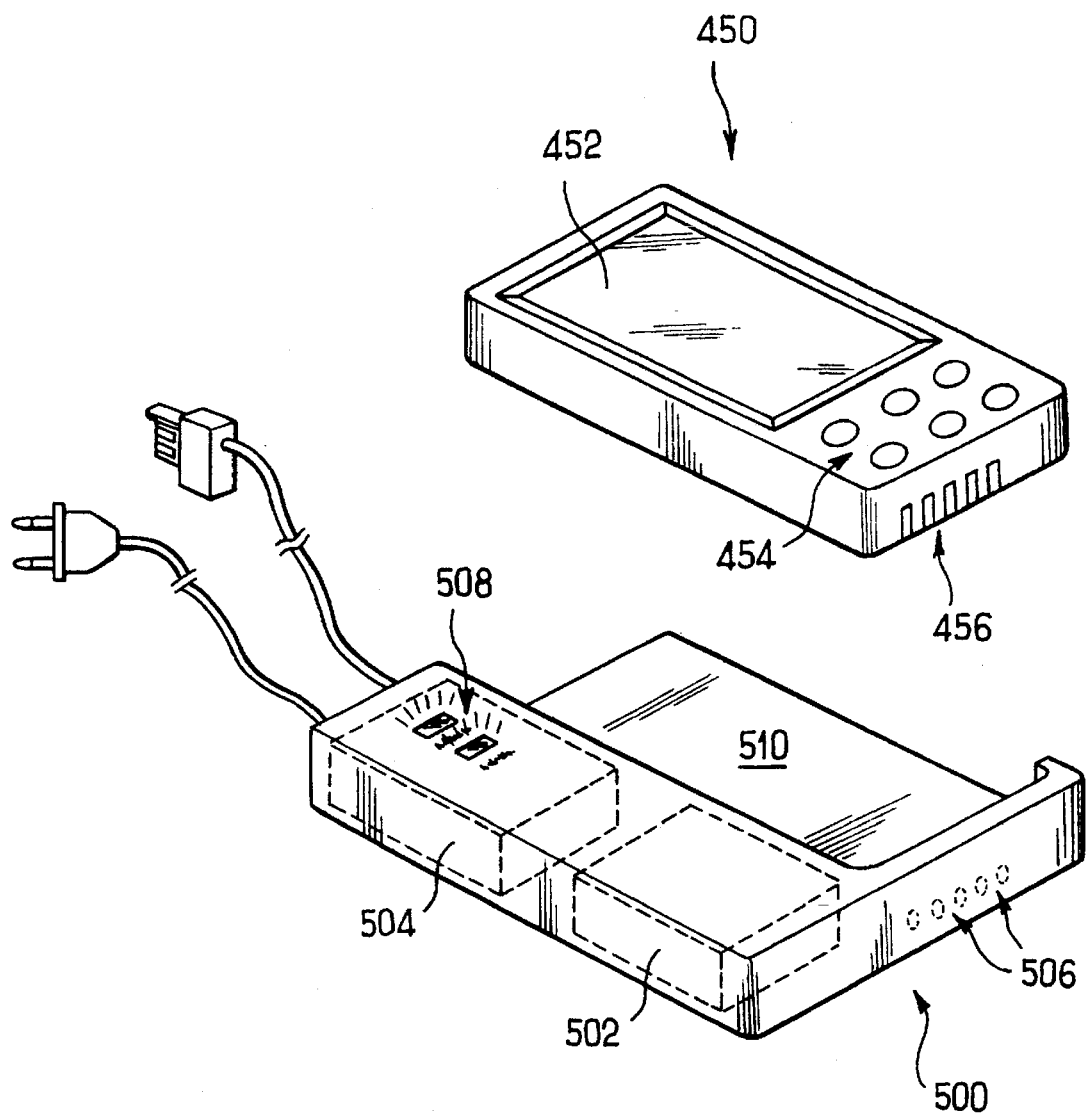
FIG. 5 shows an embodiment of a recharging and communications base for an electronic notepad.

With reference now to FIG. 5, there can be seen an electronic notepad given general reference 450, which comprises in conventional manner a central unit associated with memories and input/output circuits, a screen 452 of the liquid crystal type, and a simplified key pad 454. The notepad also includes a series of contacts 456 flush with one of its side edges.

According to the invention, there is provided optionally in association with the peripheral device of the invention, a support given overall reference 500, for receiving the notepad 450.

The support has a recess 510 for receiving the notepad, with electrical contacts 506 on a wall thereof for the purpose of co-operating with the contacts 456 of the notepad when it is installed therein.

According to an essential aspect, the support 500 includes both:

a power supply block 502 serving to convert mains electricity into a DC voltage for recharging the batteries of the notepad via some of the contacts 456, 506; and a modem 504 which is electrically powered by the block 502 and is connected (preferably via a serial link) to the notepad 450 via other contacts 456, 506. The modem may also be connected to the telephone network via an appropriate cord.

In this way, the notepad 450 need not have its own modem, since this function can be provided by the support 500 as soon as the notepad is engaged therewith.

Thus, by putting the notepad in its support, the following are ensured simultaneously in a manner that is extremely practical for the user: the batteries are recharged; and the notepad is enabled to communicate with remote sites via the telephone network. Naturally, the modem may be designed to send and receive faxes.

Naturally, the present invention is not limited in any way to the embodiments described and shown, and the person skilled in the art will know how to make any variants or mollifications thereto in the spirit of the invention.

I claim:

1. A peripheral device for a computer, the device comprising:
   a thin flat housing having a flat bottom surface for resting on a work surface and having a top surface that is generally planar and smooth;
   a keyboard and a flat screen disposed in a central zone of the device; and
   two blank zones situated on either side of said central zone; wherein the housing has width and depth dimensions substantially greater than necessary for accommodating said keyboard and said screen to enable the housing to constitute a desk pad that permanently occupies a portion of a work surface.

2. A device according to claim 1, wherein the screen is disposed between the keyboard and an edge of the device adjacent to the user.

3. A device according to claim 1 further comprising:
   a metal framework including a peripheral frame and receiving the keyboard and the flat screen;
   a transparent plate covering said screen;
   a thin plate having an opening for the keyboard and defining with said transparent plate a generally smooth surface; and
   a flexible membrane covering said transparent plate and said thin plate.

4. A device according to claim 3, wherein the transparent plate constitutes a device for detecting x/y coordinates superposed on the flat screen.

5. A device according to claim 3, wherein the keyboard is constituted by a plurality of depressible keys separated from one another by partitions, said keys and said partitions defining a generally plane and continuous top surface over which said membrane is applied.

6. A device according to claim 5, wherein said keys have rounded edges.

7. A device according to claim 3 wherein said membrane is printed on its inside face while remaining transparent over the screen.

8. A device according to claim 1 wherein its depth is about 40 cm to 60 cm and its width is about 60 cm to 80 cm.

9. A device according to claim 1 wherein its thickness is about 15 mm.

10. A device according to claim 1, wherein the housing comprises a recess that is open on top and in which the keyboard is received in removable manner, together with surface electrical contact means between the housing of the keyboard and the wall of the recess.

11. A device according to claim 10, wherein the housing of the keyboard has a generally smooth bottom surface, said keyboard being capable of being turned upside-down and placed in the recess in such a manner that said bottom surface lies substantially flush with the remainder of the top surface of the device.

12. A device according to claim 1 wherein in the vicinity of an edge adjacent to the user it includes downwardly-projecting positioning portions for co-operating with the edge of a work surface.

13. A device according to claim 12, further comprising:
   a single cable for connection to the central unit of a computer.

14. A device according to claim 13, wherein the cable leads into one of the positioning portions.

15. A device according to claim 1 wherein it has a single cable for connection to the central unit of a computer.

16. A device according to claim 1 further comprising:

cordless communication means for communication with an auxiliary peripheral device, and in particular with a mouse.

17. A peripheral device for a computer, the device comprising:

a thin flat housing having a flat bottom surface for resting on a work surface and having a top surface that is generally planar and smooth;

a keyboard and a flat screen disposed in a central zone of the device; and two blank zones situated on either side of said central zone; wherein the housing has a width in the range of about 24–32 inches and a depth in the range of about 16–24 inches, the width and depth dimensions being substantially greater than necessary for accommodating said keyboard and said screen to enable the housing to constitute a desk pad that permanently occupies a portion of a work surface.

18. A peripheral device for a computer, the device comprising:

a thin flat housing suitable for resting on a work surface and having a top surface that is generally planar and smooth;

a keyboard and a fiat screen disposed in a central zone of the device;

two blank zones situated on either side of said central zone;

a metal framework including a peripheral frame and receiving the keyboard and the flat screen;

a transparent plate covering the screen;

a thin plate having an opening for the keyboard and defining with the transparent plate a generally smooth surface; and a flexible membrane covering the transparent plate and the thin plate; wherein the housing has dimensions selected to enable the housing to constitute a desk pad that permanently occupies a portion of a work surface.

* * * * *